United States Patent
Ahrendt

(10) Patent No.: US 7,409,820 B2
(45) Date of Patent: Aug. 12, 2008

(54) ELECTRICAL THRUST REVERSER TERTIARY LOCK SYSTEM INCLUDING A VOLTAGE LIMITING CIRCUIT

(75) Inventor: Terry L Ahrendt, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/990,918

(22) Filed: Nov. 16, 2004

(65) Prior Publication Data

US 2006/0101806 A1    May 18, 2006

(51) Int. Cl.
 *F02K 3/02* (2006.01)
(52) U.S. Cl. .................. 60/226.2; 244/110 B
(58) Field of Classification Search ............. 60/226.2, 60/230; 244/110 B
See application file for complete search history.

(56) References Cited

U.S. PATENT DOCUMENTS

| | | | |
|---|---|---|---|
| 4,290,004 A | | 9/1981 | Smith |
| 4,683,529 A | | 7/1987 | Bucher, II |
| 4,685,046 A | | 8/1987 | Sanders |
| 4,725,759 A | | 2/1988 | Tachikawa |
| 4,801,887 A | | 1/1989 | Wegener |
| 5,609,020 A | * | 3/1997 | Jackson et al. ............. 60/226.2 |
| 5,735,557 A | * | 4/1998 | Harvey ........................ 292/216 |
| 5,953,904 A | * | 9/1999 | Mountney ................... 60/226.2 |
| 5,960,626 A | | 10/1999 | Baudu et al. |
| 6,021,636 A | | 2/2000 | Johnson et al. |
| 6,439,504 B1 | | 8/2002 | Ahrendt |
| 6,684,623 B2 | * | 2/2004 | Langston et al. ............. 60/226.2 |
| 6,688,098 B2 | * | 2/2004 | Rouyer et al. ............... 60/226.2 |
| 6,786,039 B2 | * | 9/2004 | Chakkera et al. ............. 60/226.2 |
| 6,786,315 B1 | * | 9/2004 | Christensen ............... 192/48.7 |
| 7,093,424 B2 | * | 8/2006 | Hanlon et al. ............... 60/226.2 |
| 2003/0019206 A1 | | 1/2003 | Johnson |
| 2003/0101712 A1 | | 6/2003 | Johnson et al. |
| 2004/0139725 A1 | | 7/2004 | Colotte et al. |
| 2005/0001095 A1 | * | 1/2005 | Christensen ............ 244/110 B |

FOREIGN PATENT DOCUMENTS

WO        2006135402 A1    12/2006

OTHER PUBLICATIONS

International Search Report (PCT/US2005/041715) dated May 14, 2007.

* cited by examiner

*Primary Examiner*—William H. Rodríguez
(74) *Attorney, Agent, or Firm*—Ingrassia, Fisher & Lorenz, P.C.

(57) ABSTRACT

A system for moving an aircraft thrust reverser component includes a power drive unit, a thrust reverser actuator assembly, and a tertiary lock system. The power drive unit is operable to rotate and supply a rotational drive force. The thrust reverser actuator assembly receives the rotational drive force from the power drive unit and moves the thrust reverser component between a stowed position and a deployed position. The tertiary lock system selectively engages and disengages the thrust reverser component and includes a tertiary lock power unit, an electromechanical tertiary lock assembly, and a voltage limiting circuit. The voltage limiting circuit limits the voltage magnitude of a control signal supplied to the tertiary lock assembly to a predetermined value.

29 Claims, 3 Drawing Sheets

US 7,409,820 B2

ELECTRICAL THRUST REVERSER TERTIARY LOCK SYSTEM INCLUDING A VOLTAGE LIMITING CIRCUIT

TECHNICAL FIELD

The present invention relates to aircraft engine thrust reverser actuation systems and, more particularly, to an electrically-operated thrust reverser system tertiary lock that includes a voltage limiting circuit.

BACKGROUND

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The moveable thrust reverser components in each of the above-described designs are moved between the stowed and deployed positions by actuators. Power to drive the actuators may come from a dual output power drive unit (PDU), which may be electrically, hydraulically, or pneumatically operated, depending on the system design. A drive train that includes one or more drive mechanisms, such as flexible rotating shafts, may interconnect the actuators and the PDU to transmit the PDU's drive force to the moveable thrust reverser components.

The primary use of thrust reversers is, as noted above, to enhance the braking of the aircraft, thereby shortening the stopping distance during landing. Hence, thrust reversers are usually deployed during the landing process to slow the aircraft. Thereafter, when the thrust reversers are no longer needed, they are returned to their original, or stowed, position. Once in the stowed position, one or more locks are engaged to prevent unintended movement of the thrust reversers and/or actuators that move the thrust reversers.

Although the number of locks may vary, many thrust reverser systems include primary, secondary, and tertiary locks. Depending on thrust reverser system configuration, one or more primary locks may be coupled to one or more of the actuators, one or more secondary locks (or "brakes") may be coupled to the PDU, and one or more tertiary locks may be coupled to one or more of the thrust reversers.

In some thrust reverser systems, the tertiary locks may be electromechanical type of locks that receive AC electrical power from the aircraft power system. The AC electrical power from the aircraft power system, which is typically around a nominal value of 115 VAC, may be converted to a DC power signal having a much lower voltage magnitude. This DC power signal is in turn used to control the tertiary locks. The aircraft power system may fluctuate, both above and below, the nominal voltage magnitude, which may cause the DC power signal supplied to the tertiary locks to also fluctuate above and below a nominal magnitude. If the DC power signal fluctuates too low below the nominal voltage magnitude, the tertiary locks may not release. If the DC power signal fluctuates too high above the nominal magnitude, one or more components of the tertiary locks can overheat and/or otherwise be damaged.

Hence, there is a need for a tertiary lock system that can accommodate voltage fluctuations in an aircraft power system while supplying DC power to a tertiary lock in a manner that does not prevent the tertiary locks from releasing when commanded to do so, and/or that does not result in one or more components of the tertiary locks overheating and/or otherwise becoming damaged. The present invention addresses at least this need.

BRIEF SUMMARY

The present invention provides an electrically-operated thrust reverser system tertiary lock including a voltage limiting circuit.

In one embodiment, and by way of example only, a system for moving an aircraft thrust reverser component includes a power drive unit, a thrust reverser actuator assembly, and a tertiary lock system. The power drive unit is operable to rotate and thereby supply a rotational drive force. The thrust reverser actuator assembly is coupled to receive the rotational drive force and is operable, in response thereto, to selectively move the thrust reverser component between a stowed position and a deployed position. The tertiary lock system is configured to selectively engage and disengage the thrust reverser component to thereby prevent and allow movement thereof, respectively. The tertiary lock system includes a tertiary lock power unit, an electromechanical tertiary lock assembly, and a voltage limiting circuit. The tertiary lock power unit is configured to selectively receive an AC tertiary lock release command signal and is operable, upon receipt thereof, to supply a DC lock release command signal. The electromechanical tertiary lock assembly is adapted to receive a DC tertiary lock control signal and is configured, upon receipt thereof, to move between a locked position and an unlocked position. The voltage limiting circuit is coupled between the tertiary lock power unit and the electromechanical tertiary lock assembly. The voltage limiting circuit is coupled to receive the DC lock release command signal from the tertiary lock power unit and is operable, upon receipt thereof, to supply the DC tertiary lock control signal to the electromechanical tertiary lock assembly. The DC tertiary lock control signal has a voltage magnitude that is limited to a predetermined value.

In another exemplary embodiment, an aircraft thrust reverser tertiary lock system includes a tertiary lock power unit, an electromechanical tertiary lock assembly, and a voltage limiting circuit. The tertiary lock power unit is configured to selectively receive an AC tertiary lock release command signal and is operable, upon receipt thereof, to supply a DC lock release command signal. The electromechanical tertiary lock assembly is adapted to receive a DC tertiary lock control signal and is configured, upon receipt thereof, to move between a locked position and an unlocked position. The voltage limiting circuit is coupled between the tertiary lock power unit and the electromechanical tertiary lock assembly. The voltage limiting circuit is coupled to receive the DC lock release command signal from the tertiary lock power unit and is operable, upon receipt thereof, to supply the DC tertiary lock control signal to the electromechanical tertiary lock assembly. The DC tertiary lock control signal has a voltage magnitude that is limited to a predetermined value.

In yet another exemplary embodiment, an aircraft thrust reverser tertiary lock system includes a lock, a voltage limiting circuit, a DC motor, and a tertiary lock actuator. The lock is movable between a locked position and an unlocked position. The voltage limiting circuit is adapted to receive a DC lock release command signal and is operable, in response thereto, to supply a DC tertiary lock control signal having a voltage magnitude that is limited to a predetermined value. The DC motor is coupled to receive the DC tertiary lock control signal and is operable, in response thereto, to supply a lock release drive force. The tertiary lock actuator is coupled to receive the lock release drive force from the DC motor and is operable, in response thereto, to move the lock to the unlocked position.

In still another exemplary embodiment, a tertiary lock system power unit for supplying a DC tertiary lock control signal to an electromechanical tertiary lock assembly includes a step-down transformer, a rectifier, and a voltage limiting circuit. The step-down transformer is adapted to receive a tertiary lock release command signal, which is an AC signal of a first peak voltage magnitude, and is operable, upon receipt thereof, to supply an AC signal of a second peak voltage magnitude that is less than the first peak voltage magnitude. The rectifier circuit is coupled to receive the AC signal of the second peak voltage magnitude from the step-down transformer and is configured, upon receipt thereof, to supply a DC signal of a third voltage magnitude. The voltage limiting circuit is coupled to receive the DC signal of the third voltage magnitude from the rectifier circuit and is operable, upon receipt thereof, to supply the DC tertiary lock control signal to the electromechanical tertiary lock assembly at a fourth voltage magnitude, which is less than or equal to a predetermined voltage limit.

Other independent features and advantages of the preferred tertiary lock system will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific thrust reverser system design. Thus, although the description is explicitly directed toward an embodiment that is implemented in a cascade-type thrust reverser system, in which transcowls are used as the moveable thrust reverser component, it should be appreciated that it can be implemented in other thrust reverser actuation system designs, including those described above and those known now or hereafter in the art.

Figure 1:
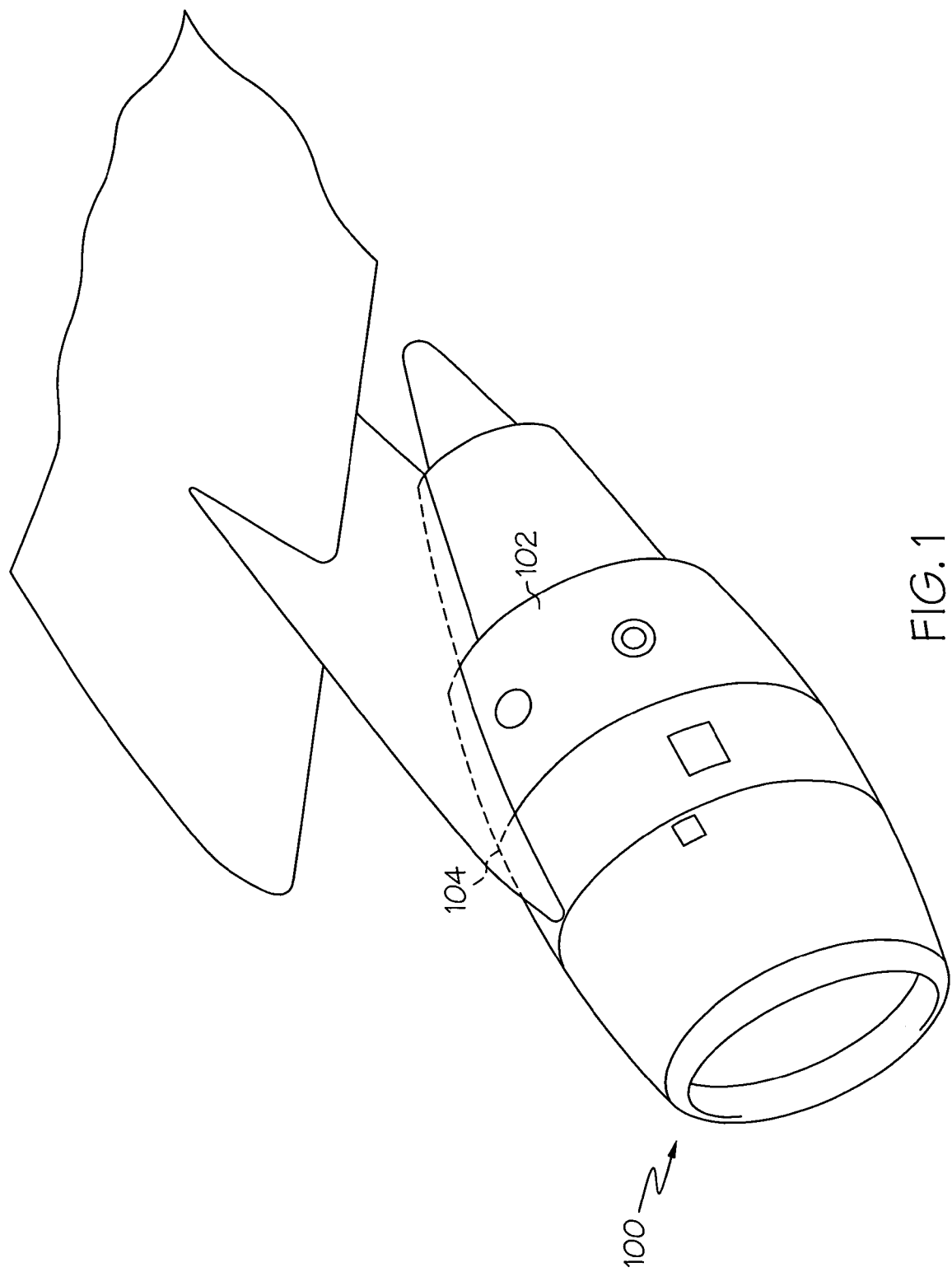
FIG. 1 is a perspective view of portions of an aircraft jet engine fan case.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 and 104 that are positioned circumferentially on the outside of the fan case 100. The transcowls 102 and 104 cover a plurality of non-illustrated cascade vanes. A mechanical link 202 (see FIG. 2), such as a pin or latch, may couple the transcowls 102 and 104 together to maintain the transcowls 102 and 104 in correct alignment on non-illustrated guides on which the transcowls 102 and 104 translate. When the thrust reversers are commanded to deploy, the transcowls 102 and 104 are translated aft. This, among other things, exposes the cascade vanes, and causes at least a portion of the air flowing through the engine fan case 100 to be redirected, at least partially, in a forward direction. This re-direction of air flow in a forward direction creates a reverse thrust, and thus works to slow the airplane.

Figure 2:
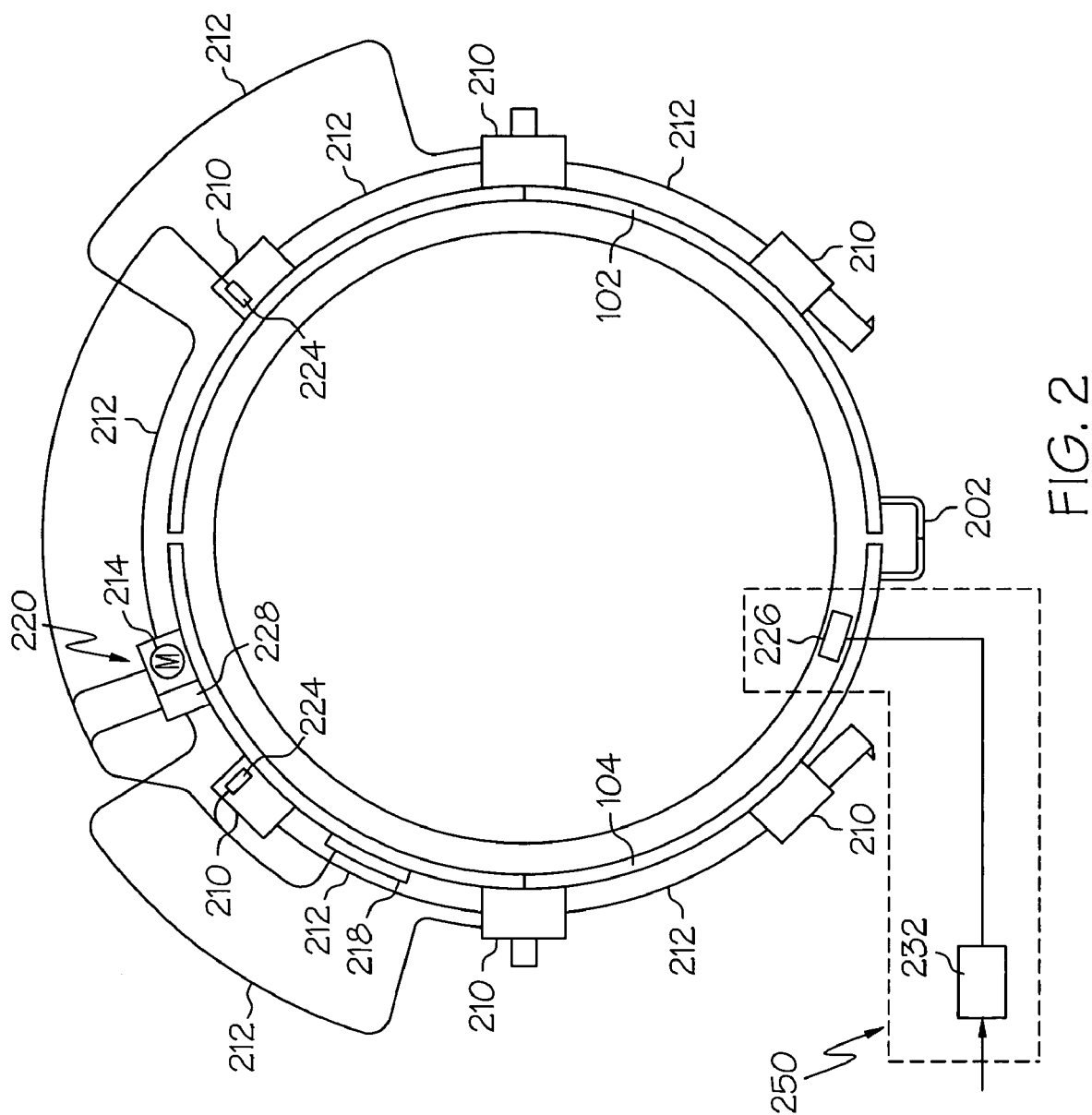
FIG. 2 is a simplified end view of a thrust reverser actuation system according to an exemplary embodiment of the present invention.

The transcowls 102 and 104 are moved between the deploy and stow positions via a thrust reverser control system. An exemplary embodiment of a thrust reverser control system 200 is depicted in FIG. 2, and includes a plurality of actuators 210, which are individually coupled to the transcowls 102 and 104. In the depicted embodiment, half of the actuators 210 are coupled to one of the transcowls 102, and the other half are coupled to another transcowl 104. It is noted that the actuators 210 may be any one of numerous actuator designs presently known in the art or hereafter designed. However, in this embodiment the actuators 210 are ballscrew actuators. It is additionally noted that the number and arrangement of actuators 210 is not limited to what is depicted in FIG. 2, but could include other numbers of actuators 210 as well. The number and arrangement of actuators 210 is selected to meet the specific design requirements of the system.

The actuators 210 are interconnected via a plurality of drive mechanisms 212, each of which, in the particular depicted embodiment, is a flexible shaft. Using flexible shafts 212 in this configuration ensures that the actuators 210 and the transcowls 102 and 104, when unlocked, move in a substantially synchronized manner. For example, when one transcowl 102 is moved, the other transcowl 104 is moved a like distance at substantially the same time. Other synchronization mechanisms that may be used include electrical synchronization or open loop synchronization, or any other mechanism or design that transfers power between the actuators 210.

A power drive unit (PDU) 220 is coupled to the actuators 210 via one or more of the flexible shafts 212. In the depicted embodiment, the PDU 220 includes a motor 214 that is coupled to two of the flexible shafts 212. The motor 214 may be any one of numerous types of motors such as, for example, an electric (including any one of the various DC or AC motor designs known in the art), a hydraulic, or a pneumatic motor. In the depicted arrangement, the rotation of the PDU 220 results in the synchronous operation of the actuators 210, via the flexible shafts 212, thereby causing the transcowls 102 and 104 to move at substantially the same rate.

A control circuit 218 controls the PDU 220, and receives various signals from one or more positions sensors. The control circuit 218 receives commands from an engine control system 222 such as, for example, a FADEC (full authority digital engine control) system, and provides appropriate activation signals to the PDU 220 in response to the received commands. In turn, the PDU 220 supplies a drive force to the actuators 210 via the flexible shafts 212. As a result, the actuators 210 cause the transcowls 102 and 104 to translate between the stowed and deployed positions.

The thrust reverser control system 200 additionally includes a plurality of locks that together function to prevent unintended movement of the transcowls 102 and 104 from the stowed position. In the depicted embodiment, the thrust reverser control system 200 includes two primary locks 224, a PDU lock 226 (or "brake"), and tertiary lock 228. The primary locks 224 are each mounted on one of the actuators 210 and are configured to selectively prevent movement of one of the actuators 210, and thereby prevent transcowl movement. The PDU brake 226 is configured to selectively prevent or allow rotation of the PDU 220, and thereby prevent transcowl movement. The tertiary lock 228 is mounted on the engine nacelle (not illustrated) and is configured to selectively engage a portion of one of the transcowls 104 directly. Because the transcowls 102, 104 are coupled via the mechanical link 202, the tertiary lock 228 prevents movement of both transcowls 102, 104. In the depicted embodiment, the primary lock 224 and PDU brake 228 are each controlled via the control circuit 218. However, as will be described in more detail further below, the tertiary lock 228 forms part of a separate tertiary lock system 250, and is controlled via a separate tertiary lock power unit 232.

It will be appreciated that the number of locks 224, 226, 228 depicted and described herein is merely exemplary of one particular embodiment, and that other numbers of locks could be used to meet specific design requirements. It will additionally be appreciated that each of the locks 224, 226, 228 is configured to default to a normally locked position by, for example, a biasing spring. Thus, when not commanded to move to the unlocked position, each lock 224, 226, 228 will be in, or move to, the locked position. The specific structural configuration of the primary locks 224 and PDU brake 226 is not necessary to understand or enable the present invention, and will therefore not be provided. However, with reference now to FIGS. 3 and 4, a more detailed description of the tertiary lock system 250 and its operation will be provided.

Figure 3:
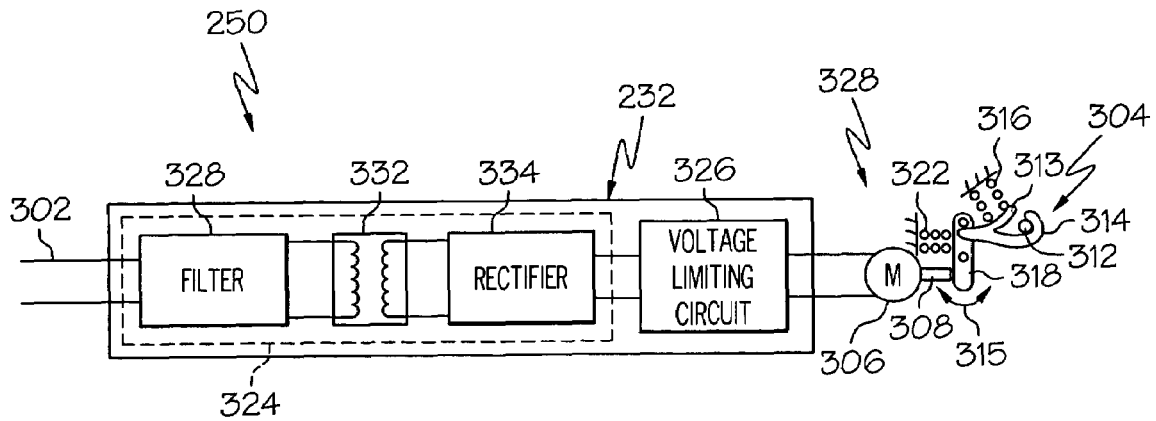
FIG. 3 is functional block diagram of an embodiment of a tertiary lock system that may be included in the thrust reverser actuation system of FIG. 2.

Turning first to FIG. 3, it is seen that the tertiary lock system 250 includes two sub-systems, the tertiary lock system power unit 232 and the tertiary lock 228. The tertiary lock system power unit 232 is coupled to receive a single-phase, AC tertiary lock release command signal from, for example, the aircraft electrical power distribution system 302. As was previously mentioned, the frequency and voltage magnitude of the aircraft electrical power distribution system 302 may vary, both above and below, nominal values. As will be described in more detail further below, the tertiary lock system power unit 232 is configured to convert the AC lock release command signal, which may vary in both frequency and voltage magnitude, to a DC tertiary lock control signal having a voltage magnitude that is limited to a predetermined value. The DC tertiary lock control signal is in turn supplied to the tertiary lock 228, an embodiment of which will now be described.

The tertiary lock 228 is an electromechanical lock assembly and includes a lock 304, a DC motor 306, and a lock actuator 308. The lock 304 includes a retaining member 312, locking member 314, a locking member spring 316, and a blocking member 318, and a blocking member spring 322. The retaining member 312 is mounted on the transcowl 104 (not shown in FIG. 3), and the locking member 314 is mounted on a beam within the engine case (not shown in FIG. 3). The locking member 314 is movable between a locked position, in which it engages the retaining member 312, and an unlocked position, in which it disengages the retaining member 312. The locking member spring 316 biases the locking member 314 toward the unlocked position. As shown in FIG. 3, the locking member 314 preferably includes a cam surface 313 that the retaining member 312 engages when the transcowl 104 is returning to the stowed position. When the retaining member 312 engages the cam surface 313, it moves the locking member 314, against the force of the locking member spring 316, back into the locked position, where it is retained by the blocking member 318.

The blocking member 318 is pivotally mounted in the engine case (as shown by double-headed arrow 315) and is configured to pivot between an engage position and a release position. The blocking member spring 322 biases the blocking member 318 toward the engage position. In the engage position, the blocking member 318 prevents the locking member 314 from moving out of the locked position, but allows the locking member 314 to move into the locked position from the unlocked position. In the disengage position, the blocking member 318 allows the locking member 314 to move, under the force of the locking member spring 316, to the unlocked position, or to move freely from the unlocked position to the locked position, if engaged by the retaining member 312 as the transcowl 104 moves to the stowed position.

The blocking member 318 is pivoted to the disengage position by the actuator 308, which moves in response to a drive force supplied from the DC motor 306. The DC motor 306 may be implemented as any one of numerous types of DC motors now known or developed in the future, but in the preferred embodiment it is implemented as a brush-type DC motor. In any case, the DC motor 306, in response to the DC tertiary lock control signal supplied by the tertiary lock system power unit 232, rotates in the appropriate direction and supplies a drive force to the actuator 308. In turn, the actuator 308 engages the blocking member 318 and moves it, against the bias force of the blocking member spring 322, to the disengage position, thereby allowing the locking member 314 to move to the unlocked position. It will be appreciated that when the DC tertiary lock control signal is removed, thereby de-energizing the DC motor 306, the bias force of the blocking member spring 322 moves the blocking member 318 back to the engage position.

Turning now to a more detailed description of the tertiary lock system power unit 232, it is seen that it includes a power unit 324 and a voltage limiting circuit 326. The power unit 324 includes a filter circuit 328, a step-down transformer 332, and a rectifier circuit 334. The filter circuit 328 removes any unwanted high-frequency signal components from the AC tertiary lock release command signal. Such high-frequency signal components may be due, for example, to electromagnetic interference (EMI) that may be generated by the various circuit components and/or the motor 306. The filtered AC tertiary lock release command signal is then supplied to the step-down transformer 332.

The step-down transformer 332 functions to reduce the voltage magnitude of the filtered AC tertiary lock release command signal, and the rectifier circuit 334, which is preferably implemented as a full-wave rectifier circuit, converts the reduced magnitude AC signal to a DC lock release command signal. The amount that the step-down transformer 332 reduces the voltage magnitude will depend, as is generally known, on the turns-ratio of the step-down transformer 332. Moreover, as was previously mentioned, the AC tertiary lock signal may vary in voltage magnitude and frequency. Thus, a step-down transformer 332 with the desired turns-ratio, as well as the desired frequency response and power requirements, is chosen. For example, in a particular physical implementation, it is postulated that the peak voltage magnitude of the AC tertiary lock release command may vary from a low value ($VAC_{LOW}$) to a high value ($VAC_{HIGH}$), and the frequency may vary from a low frequency value ($FREQ_{LOW}$) to a high frequency value ($FREQ_{HIGH}$). Thus, the step-down transformer 332 is chosen so that, following rectification in the rectifier circuit 334, the DC lock release command signal will not drop below a desired minimum value ($VDC_{LOW}$) when the AC tertiary lock release command signal is at the low value ($VAC_{LOW}$) and at any frequency between the low ($FREQ_{LOW}$) and high ($FREQ_{HIGH}$) frequency values.

The DC lock release command signal is supplied to the voltage limiting circuit 326. The voltage limiting circuit 326 is configured, upon receipt of the DC lock release command signal, to supply a DC tertiary lock control signal to the DC motor 306 that has a voltage magnitude limited to a predetermined value ($VDC_{MAX}$). More particularly, when the voltage magnitude ($VDC_{RELEASE}$) of the DC lock release command signal is at or below the predetermined value (e.g., $VDC_{RELEASE} \leq VDC_{MAX}$), the DC tertiary lock control signal supplied by the voltage limiting circuit 326 will have a voltage magnitude ($VDC_{CONTROL}$) equal to the DC lock release command signal (e.g., $VDC_{CONTROL}=VDC_{RELEASE}$). However, if the voltage magnitude ($VDC_{RELEASE}$) of the DC lock release command signal exceeds the predetermined value (e.g., $VDC_{RELEASE} > VDC_{MAX}$), then the DC tertiary lock control signal supplied by the voltage limiting circuit 326 will have a voltage magnitude equal to the predetermined value (e.g., $VDC_{CONTROL}=VDC_{MAX}$). A particular preferred physical implementation of the voltage limiting circuit 326 is illustrated in FIG. 4, and will now be described in more detail.

Figure 4:
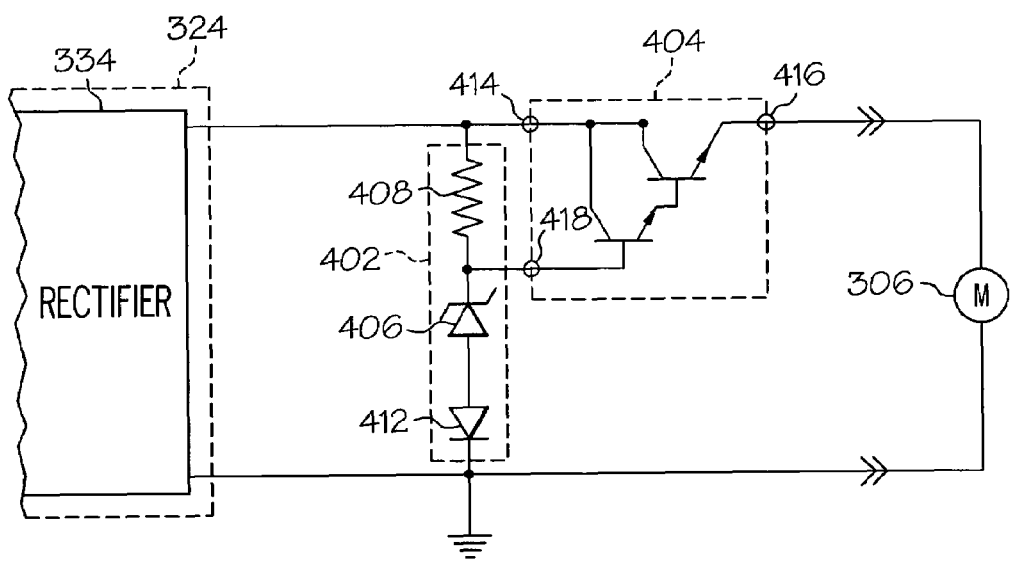
FIG. 4 is a schematic diagram of a voltage limiting circuit according to an embodiment of the present invention that may be used in the tertiary lock system of FIG. 3.

As FIG. 4 shows, the voltage limiting circuit includes a voltage limiter circuit 402 and an voltage follower circuit 404. The voltage limiter circuit 402 functions to limit the magnitude of the DC tertiary lock control signal to the predetermined value, and in the depicted embodiment includes a zener diode 406, a current limiting resistor 408, and a diode 412. As is generally known, the zener diode 406 will conduct when the voltage magnitude across it (e.g., $VDC_{RELEASE}$) is at or above its so-called "zener voltage." Moreover, once the zener diode 406 does conduct, the voltage drop across it will be a substantially constant value (e.g., $VDC_{MAX}$). The current limiting resistor 408 is included to limit the current flow through the zener diode 406, and the diode 412 prevents reverse current flow through the zener diode 406, which could occur since the DC motor 306 is an inductive load.

The voltage follower circuit 404 is a relatively simple, unity gain amplifier that includes an input terminal 414, an output terminal 416, and a control terminal 418. The amplifier input 414 and output 416 terminals are electrically coupled in series between the power unit 324 and the DC motor 306, and the control terminal 418 is electrically coupled between the zener diode 406 and the current limiting resistor 408. Although any one of numerous unity gain amplifier circuit configurations could be used to implement the amplifier circuit 404, in the depicted embodiment it is implemented in a conventional Darlington amplifier configuration. As is generally known, Darlington amplifiers operate over a wide temperature range.

With the above described circuit configuration, the output of the voltage follower circuit 404, which is also the DC tertiary lock control signal, will have a voltage magnitude substantially equal to the voltage supplied to the control terminal 418. Thus, when the voltage magnitude of the DC lock release command signal is below the zener voltage, no current will flow through the zener diode 406, and this voltage magnitude will be supplied to the control terminal 418. As a result, the voltage magnitude of the DC tertiary control signal will be substantially equal to that of the DC lock release command signal. Conversely, when the voltage magnitude of the DC lock release command signal is at or above the zener voltage, current will flow through the zener diode 406, and the zener voltage magnitude ($VDC_{MAX}$) will be supplied to the control terminal 418. As a result, the voltage magnitude of the DC tertiary control signal will be substantially equal to the zener voltage magnitude.

The tertiary lock system described herein can accommodate voltage fluctuations in an aircraft power system while supplying DC power to a tertiary lock, and do so in a manner that does not result in one or more components of the tertiary locks overheating and/or otherwise becoming damaged. The system includes a voltage limiting circuit that is relatively simple, and relatively inexpensive, to implement.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A system for moving an aircraft thrust reverser component, comprising:

a power drive unit operable to rotate and thereby supply a rotational drive force;

a thrust reverser actuator assembly coupled to receive the rotational drive force and operable, in response thereto, to selectively move the thrust reverser component between a stowed position and a deployed position; and a tertiary lock system configured to selectively engage and disengage the thrust reverser component to thereby prevent and allow movement thereof, respectively, the tertiary lock system including:

a tertiary lock power unit configured to selectively receive an AC tertiary lock release command signal and operable, upon receipt thereof, to supply a DC lock release command signal;

an electromechanical tertiary lock assembly adapted to receive a DC tertiary lock control signal and configured, upon receipt thereof, to move between a locked position and an unlocked position; and a voltage limiting circuit coupled between the tertiary lock power unit and the electromechanical tertiary lock assembly, the voltage limiting circuit coupled to receive the DC lock release command signal from the tertiary lock power unit and operable, upon receipt thereof, to supply the DC tertiary lock control signal to the electromechanical tertiary lock assembly, the DC tertiary lock control signal having a voltage magnitude that is limited to a predetermined value.

2. The system of claim 1, wherein the electromechanical tertiary lock assembly comprises:
   a lock movable between a locked position and an unlocked position;
   a DC motor coupled to receive the DC lock release command and operable, in response thereto, to supply a lock release drive force; and
   a tertiary lock actuator coupled to receive the lock release drive force from the DC motor and operable, in response thereto, to move the lock to the unlocked position.

3. The system of claim 2, wherein the DC motor is a brush-type DC motor.

4. The system of claim 1, wherein the tertiary lock release command signal is an AC signal of a first peak voltage magnitude, and wherein the tertiary lock power unit comprises:
   a step-down transformer adapted to receive the AC tertiary lock release command signal and operable, upon receipt thereof, to supply an AC signal of a second peak voltage magnitude, the second peak voltage magnitude being less than the first peak voltage magnitude;
   a rectifier circuit coupled to receive the AC signal of the second peak voltage magnitude from the step-down transformer and configured, upon receipt thereof, to supply the DC lock release command signal.

5. The power unit of claim 4, wherein the step-down transformer includes a primary winding and a secondary winding, and wherein the power unit further comprises:
   an input filter circuit coupled to the step-down transformer primary winding, the filter circuit configured to receive the tertiary lock release command signal and remove selected frequency components therefrom.

6. The power unit of claim 4, wherein the rectifier circuit comprises a full-wave bridge rectifier circuit.

7. The power unit of claim 4, wherein the voltage limiting circuit comprises:
   a voltage limiter coupled in parallel with the rectifier circuit and configured to limit the DC tertiary lock control signal to the fourth voltage magnitude, the voltage limiter including a first terminal, a second terminal, and a third terminal, the first terminal coupled to the rectifier circuit, the second terminal coupled to the rectifier circuit and adapted to couple to the electromechanical tertiary lock assembly; and
   a voltage follower circuit including at least an input terminal, an output terminal, and a control terminal, the voltage follower circuit input terminal coupled to the voltage limiter first terminal, the voltage follower circuit control terminal coupled to the voltage limiter third terminal, and the voltage follower circuit output terminal adapted to couple to the electromechanical tertiary lock assembly.

8. The power unit of claim 7, wherein the voltage limiter comprises:
   a resistor circuit and a zener diode circuit electrically coupled in series with one another, the resistor circuit electrically coupled in series between the first and third terminals, and the zener diode circuit electrically coupled in series between the second and third terminals.

9. The power unit of claim 8, wherein the voltage limiter further comprises:
   a diode circuit electrically coupled in series with the resistor circuit and the zener diode circuit.

10. The power unit of claim 9, wherein the diode circuit is configured to prevent reverse current flow through the zener diode.

11. The power unit of claim 7, wherein the voltage follower circuit comprises a Darlington pair.

12. An aircraft thrust reverser tertiary lock system, comprising:
   a tertiary lock power unit configured to selectively receive an AC tertiary lock release command signal and operable, upon receipt thereof, to supply a DC lock release command signal;
   an electromechanical tertiary lock assembly adapted to receive a DC tertiary lock control signal and configured, upon receipt thereof, to move between a locked position and an unlocked position; and
   a voltage limiting circuit coupled between the tertiary lock power unit and the electromechanical tertiary lock assembly, the voltage limiting circuit coupled to receive the DC lock release command signal from the tertiary lock power unit and operable, upon receipt thereof, to supply the DC tertiary lock control signal to the electromechanical tertiary lock assembly, the DC tertiary lock control signal having a voltage magnitude that is limited to a predetermined value.

13. The system of claim 12, wherein the electromechanical tertiary lock assembly comprises:
   a lock movable between a locked position and an unlocked position;
   a DC motor coupled to receive the DC lock release command and operable, in response thereto, to supply a lock release drive force; and
   a tertiary lock actuator coupled to receive the lock release drive force from the DC motor and operable, in response thereto, to move the lock to the unlocked position.

14. The system of claim 13, wherein the DC motor is a brush-type DC motor.

15. The system of claim 12, wherein the tertiary lock release command signal is an AC signal of a first peak voltage magnitude, and wherein the tertiary lock power unit comprises:
   a step-down transformer adapted to receive the AC tertiary lock release command signal and operable, upon receipt thereof, to supply an AC signal of a second peak voltage magnitude, the second peak voltage magnitude being less than the first peak voltage magnitude;
   a rectifier circuit coupled to receive the AC signal of the second peak voltage magnitude from the step-down transformer and configured, upon receipt thereof, to supply the DC lock release command signal.

16. The system of claim 15, wherein the step-down transformer includes a primary winding and a secondary winding, and wherein the power unit further comprises:
   an input filter circuit coupled to the step-down transformer primary winding, the filter circuit configured to receive the tertiary lock release command signal and remove selected frequency components therefrom.

17. The system of claim 15, wherein the rectifier circuit comprises a full-wave bridge rectifier circuit.

18. The system of claim 15, wherein the voltage limiting circuit comprises:

a voltage limiter coupled in parallel with the rectifier circuit and configured to limit the DC tertiary lock control signal to the fourth voltage magnitude, the voltage limiter including a first terminal, a second terminal, and a third terminal, the first terminal coupled to the rectifier circuit, the second terminal coupled to the rectifier circuit and adapted to couple to the electromechanical tertiary lock assembly; and an voltage follower circuit including at least an input terminal, an output terminal, and a control terminal, the voltage follower circuit input terminal coupled to the voltage limiter first terminal, the voltage follower circuit control terminal coupled to the voltage limiter third terminal, and the voltage follower circuit output terminal adapted to couple to the electromechanical tertiary lock assembly.

19. The system of claim 18, wherein the voltage limiter comprises:

a resistor circuit and a zener diode circuit electrically coupled in series with one another, the resistor circuit electrically coupled in series between the first and third terminals, and the zener diode circuit electrically coupled in series between the second and third terminals.

20. The system of claim 19, wherein the voltage limiter further comprises:

a diode circuit electrically coupled in series with the resistor circuit and the zener diode circuit.

21. The system of claim 20, wherein the diode circuit is configured to prevent reverse current flow through the zener diode.

22. The system of claim 18, wherein the voltage follower circuit comprises a Darlington pair.

23. An aircraft thrust reverser tertiary lock system, comprising:

a lock movable between a locked position and an unlocked position;

a voltage limiting circuit adapted to receive a DC lock release command signal and operable, in response thereto, to supply a DC tertiary lock control signal, the DC tertiary lock control signal having a voltage magnitude that is limited to a predetermined value;

a DC motor coupled to receive the DC tertiary lock control signal and operable, in response thereto, to supply a lock release drive force; and a tertiary lock actuator coupled to receive the lock release drive force from the DC motor and operable, in response thereto, to move the lock to the unlocked position.

24. The system of claim 23, wherein the DC motor is a brush-type DC motor.

25. The system of claim 23, wherein the voltage limiting circuit comprises:

a voltage limiter configured to limit the DC tertiary lock control signal to the predetermined value, the voltage limiter including a first terminal, a second terminal, and a third terminal, the first and second terminals coupled to receive the DC tertiary lock control signal, the second terminal further coupled to the DC motor; and a voltage follower circuit including at least an input terminal, an output terminal, and a control terminal, the voltage follower circuit input terminal coupled to the voltage limiter first terminal, the voltage follower circuit control terminal coupled to the voltage limiter third terminal, and the voltage follower circuit output terminal coupled to the DC motor.

26. The power unit of claim 25, wherein the voltage limiter comprises:

a resistor circuit and a zener diode circuit electrically coupled in series with one another, the resistor circuit electrically coupled in series between the first and third terminals, and the zener diode circuit electrically coupled in series between the second and third terminals.

27. The system of claim 26, wherein the voltage limiter further comprises:

a diode circuit electrically coupled in series with the resistor circuit and the zener diode circuit.

28. The system of claim 27, wherein the diode circuit is configured to prevent reverse current flow through the zener diode.

29. The system of claim 23, wherein the voltage follower circuit comprises a Darlington pair.

* * * * *